(12) United States Patent
Kawai

(10) Patent No.: US 11,623,286 B2
(45) Date of Patent: Apr. 11, 2023

(54) TAPERED END MILL

(71) Applicant: OSG CORPORATION, Toyokawa (JP)

(72) Inventor: Ryogo Kawai, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 106 days.

(21) Appl. No.: 17/254,585

(22) PCT Filed: Jun. 22, 2018

(86) PCT No.: PCT/JP2018/023906
§ 371 (c)(1),
(2) Date: Dec. 21, 2020

(87) PCT Pub. No.: WO2019/244361
PCT Pub. Date: Dec. 26, 2019

(65) Prior Publication Data
US 2021/0276109 A1    Sep. 9, 2021

(51) Int. Cl.
*B23C 5/10*    (2006.01)
(52) U.S. Cl.
CPC .............. *B23C 5/1009* (2013.01); *B23C 5/10* (2013.01); *B23C 2210/24* (2013.01);
(Continued)
(58) Field of Classification Search
CPC .......... B23C 2210/405; B23C 2210/40; B23C 2210/54; B23C 2210/24; B23C 5/10; B23C 5/1009
See application file for complete search history.

(56) References Cited

U.S. PATENT DOCUMENTS

| 6,742,968 B1 | 6/2004 | Volokh |
| 2002/0106252 A1 | 8/2002 | Tsuzuki et al. |

(Continued)

FOREIGN PATENT DOCUMENTS

| CH | 675842 A5 | 11/1990 |
| CN | 101239405 A | 8/2008 |

(Continued)

OTHER PUBLICATIONS

English translation of JP-H084967-B2 (Year: 1996).*
(Continued)

*Primary Examiner* — Alan Snyder
(74) *Attorney, Agent, or Firm* — Oliff PLC

(57) ABSTRACT

A tapered end mill includes an outer circumferential cutting edge, a flute is disposed such that a flute bottom radius defined as a distance between a flute bottom and the tool axis decreases from a shank side toward the tool tip side, the flute bottom radius linearly changes at a predetermined gradient angle in the tool axis direction, the gradient angle changes at a predetermined change point to become smaller on the tool tip side as compared to the shank side, and a gradient angle θ1 on the tool tip side relative to the change point is equal to or larger than 0° and smaller than a taper half angle α of a cutting portion provided with the outer circumferential cutting edge, and a gradient angle θ2 on the shank side relative to the change point is larger than the taper half angle α.

7 Claims, 4 Drawing Sheets

(52) U.S. Cl.
CPC .. *B23C 2210/241* (2013.01); *B23C 2210/405* (2013.01); *B23C 2210/407* (2013.01)

(56) References Cited

U.S. PATENT DOCUMENTS

| | | | |
|---|---|---|---|
| 2010/0008736 A1 | 1/2010 | Matsunaga et al. | |
| 2013/0315681 A1 | 11/2013 | Volokh | |
| 2017/0087645 A1* | 3/2017 | Haimer | B23C 5/10 |
| 2017/0087646 A1* | 3/2017 | Haimer | B23C 5/1081 |
| 2017/0120349 A1 | 5/2017 | Haimer et al. | |

FOREIGN PATENT DOCUMENTS

| | | |
|---|---|---|
| CN | 204565247 U | 8/2015 |
| CN | 107755770 A | 3/2018 |
| JP | S60-100112 U | 7/1985 |
| JP | H07-171707 A | 7/1995 |
| JP | H084967 B2 * | 1/1996 |
| JP | 2001-054812 A | 2/2001 |
| JP | 2001-310211 A | 11/2001 |
| JP | 2002-233909 A | 8/2002 |
| JP | 2003-334715 A | 11/2003 |
| JP | 2008-264964 A | 11/2008 |
| JP | 2009-000771 A | 1/2009 |
| WO | 2015/197452 A1 | 12/2015 |

OTHER PUBLICATIONS

Sep. 11, 2018 International Search Report issued in International Patent Application No. PCT/JP2018/023906.
Sep. 11, 2018 Written Opinion of International Search Authority issued in International Patent Application No. PCT/JP2018/023906.
Jul. 14, 2020 Written Opinion of International Preliminary Examining Authority issued in International Patent Application No. PCT/JP2018/023906.
Jan. 4, 2022 Search Report issued in European Patent Application No. 18923218.4.

* cited by examiner

FIG.6

| | n (min⁻¹) | ap (mm) | fz (mm/t) | Vf (mm/min) | CUTTING DISTANCE (mm) | SUCCESS/ FAILURE OF CUTTING | SPINDLE LOAD | CUTTING SOUND | VIBRATION | WELDING |
|---|---|---|---|---|---|---|---|---|---|---|
| COMPARATIVE PRODUCT 1 | 24,000 | 7.7 | 0.08 | 5,760 | 150 | ○ | 67% | × | △ | ○ |
| | | | 0.10 | 7,200 | 75 | × | — | — | — | — |
| COMPARATIVE PRODUCT 2 | 24,000 | 7.7 | 0.08 | 5,760 | 150 | ○ | 62% | △ | △ | ○ |
| | | | 0.09 | 6,480 | 150 | ○ | 66% | × | × | ○ |
| | | | 0.10 | 7,200 | 150 | ○ | 68% | × | × | ○ |
| | | | 0.11 | 7,920 | 0 | × | — | — | — | — |
| PRODUCT OF PRESENT INVENTION | 24,000 | 7.7 | 0.08 | 5,760 | 150 | ○ | 64% | ○ | ○ | ○ |
| | | | 0.09 | 6,480 | 150 | ○ | 69% | ○ | ○ | △ |
| | | | 0.10 | 7,200 | 150 | ○ | 71% | ○ | ○ | △ |
| | | | 0.11 | 7,920 | 150 | ○ | 75% | △ | △ | △ |
| | | | 0.12 | 8,640 | 150 | ○ | 79% | × | × | △ |
| | | | 0.125 | 9,000 | 75 | × | — | — | — | — |

# TAPERED END MILL

TECHNICAL FIELD

The present invention relates to a tapered end mill and, more particularly, to a technique of improving chip discharge performance while ensuring predetermined strength and rigidity.

BACKGROUND ART

There is known a tapered end mill including an outer circumferential cutting edge disposed along a flute extending in a tool axis direction with the diameter of the outer circumferential cutting edge reduced toward a tool tip side (see Patent Documents 1, 2). In such a tapered end mill, the flute is disposed such that a flute bottom radius defined as a distance between a flute bottom and a tool axis decreases from a shank side toward the tool tip side so as to provide predetermined chip discharge performance even on the tool tip side having a small diameter.

PRIOR ART DOCUMENTS

Patent Documents

Patent Document 1: Japanese Laid-Open Patent Publication No. 2002-233909
Patent Document 2: Japanese Laid-Open Patent Publication No. 2003-334715
Patent Document 3: Japanese Laid-Open Patent Publication No. 7-171707

SUMMARY OF THE INVENTION

Technical Problem

To ensure high chip discharge performance, it is desirable to reduce a web thickness; however, if the web thickness is reduced, the strength and rigidity will decrease, so that the tool tends to break under machining conditions where a high machining load is applied. In this regard, for example, as described in Patent Document 3, it is conceivable that a step is formed in the flute bottom radius so as to reduce only the web thickness on the tool tip side while the web thickness of a shank side portion is made larger than the step to ensure strength and rigidity; however, the step may hinder the chip discharge performance.

The present invention was conceived in view of the situations and it is therefore an object of the present invention to increase improve the chip discharge performance while ensuring predetermined strength and rigidity of a tapered end mill having a flute disposed such that the flute bottom radius decreases from the shank side toward the tool tip side.

Solution to Problem

To achieve the above object, a first aspect of the present invention provides a tapered end mill including an outer circumferential cutting edge disposed along a flute extending in a tool axis direction with a diameter of the outer circumferential cutting edge reduced toward a tool tip side, wherein (a) the flute is disposed such that a flute bottom radius defined as a distance between a flute bottom and the tool axis decreases from a shank side toward the tool tip side, wherein (b) the flute bottom radius linearly changes at a predetermined gradient angle in the tool axis direction, wherein (c) the gradient angle changes at a predetermined change point to become smaller on the tool tip side as compare to the shank side, and wherein a gradient angle $\theta 1$ on the tool tip side relative to the change point is equal to or larger than $0°$ and smaller than a taper half angle $\alpha$ of a cutting portion provided with the outer circumferential cutting edge, and a gradient angle $\theta 2$ on the shank side relative to the change point is larger than the taper half angle $\alpha$.

A second aspect of the present invention provides the tapered end mill recited in the first aspect of the invention, wherein (a) the flute is one of a plurality of flutes disposed around the tool axis at equal angle intervals, while the outer circumferential cutting edge is one of a plurality of outer circumferential cutting edges disposed along the plurality of flutes, wherein (b) the flute is a helical flute twisted around the tool axis, and wherein a helical direction of the helical flute is determined such that chips cut out by the outer circumferential cutting edge are discharged toward the shank side when the tapered end mill is rotationally driven around the tool axis.

Therefore, the helical direction of the helical flute is a right-handed direction when the tool is rotationally driven clockwise for cutting as viewed from the shank side and is a left-handed direction when the tool is rotationally driven counterclockwise for cutting as viewed from the shank side.

A third aspect of the present invention provides the tapered end mill recited in the first or second aspect of the invention, wherein the gradient angle $\theta 1$ is within a range of $0° \leq \theta 1 \leq 30°$.

A fourth aspect of the present invention provides the tapered end mill recited in any one of the first to third aspects of the invention, wherein when D is a tip tool diameter, the change point is defined within a range of 1 D to 10 D from the tool tip in the tool axis direction.

In the case of a tapered ball end mill with the tool tip having a hemispherical shape, the tip tool diameter D is a tool diameter obtained by extending a pair of generatrices of a taper portion to the tool tip.

A fifth aspect of the present invention provides the tapered end mill recited in any one of the first to third aspects of the invention, wherein when L is a cutting edge length of the tapered end mill, the change point is defined within a range of 0.2 L to 0.7 L from the tool tip in the tool axis direction.

A sixth aspect of the present invention provides the tapered end mill recited in any one of the first to fifth aspects of the invention, wherein the gradient angle smoothly changes in the vicinity of the change point.

An seventh aspect of the present invention provides the tapered end mill recited in any one of the first to sixth aspects of the invention, wherein a rake angle of the outer circumferential cutting edge is constant over the entire length of the outer circumferential cutting edge.

Advantageous Effects of Invention

In the tapered end mill according to the present invention, since the flute bottom radius linearly changes at the predetermined gradient angle in the tool axis direction, and the gradient angle on the tool tip side is smaller than the gradient angle on the shank side, the web thickness can be reduced on the tool tip side where the radial dimension of the outer circumferential cutting edge becomes smaller while ensuring the strength and rigidity, so that the chip discharge performance can be improved. Specifically, since the gradient angle $\theta 1$ on the tool tip side relative to the change point is equal to or larger than Wand smaller than the taper half angle α of the cutting portion, the web thickness of the tool tip side portion can be reduced to improve the chip discharge performance while an extremely small web thickness can be avoided to ensure the strength and rigidity. Further, since the gradient angle θ2 on the shank side relative to the change point is larger than the taper half angle α of the cutting portion, an increase rate of the flute bottom radius, i.e., an increase rate of the web thickness, becomes larger than an increase rate of the radial dimension of the outer circumferential cutting edge increasing toward the shank, so that the strength and rigidity against a machining load can appropriately be ensured to prevent breakage etc.

The gradient angles of the flute bottom radius are only changed at the predetermined change point, and therefore, for example, when the flute is machined on the outer circumferential surface of the tapered ball end mill material with a flute machining tool such as a grinding wheel, it is only required to change a moving speed of the flute machining tool approaching to and separating from the tapered ball end mill material on the way, so that the flute can easily be machined by a single flute machining process, and chips in a longitudinal direction of the flute flow more smoothly as compared to when a step is disposed, so that the chip discharge performance is favorably maintained.

In the tapered end mill according to the second aspect of the invention, since the multiple helical flutes are disposed around the tool axis and the multiple outer circumferential cutting edges are disposed along the multiple helical flutes, the load applied to the tool is dispersed and the breakage etc. are prevented. While the outer circumferential cutting edges are disposed along the helical flutes and chips are discharged toward the shank through the helical flutes, the gradient of the flute bottom radius is only increased in the middle, and therefore, chips flow more smoothly toward the shank as compared to when a step is disposed, so that the chip discharge performance is favorably maintained.

In the tapered end mill according to the fourth aspect of the invention, since the change point of the gradient angle of the flute bottom radius is defined within the range of 1 D to 10 D from the tool tip when D is the tip tool diameter, the web thickness is reduced in a region of the relatively small gradient angle on the tool tip side relative to the change point so that the chip discharge performance can favorably be improved, and an extremely small web thickness of the tool tip side portion can be avoided to ensure the strength and rigidity.

In the tapered end mill according to the fifth aspect of the invention, since the change point of the gradient angle of the flute bottom radius is set within the range of 0.2 L to 0.7 L from the tool tip when L is the cutting edge length of the tapered end mill, the region of the relatively small gradient angle on the tool tip side relative to the change point and the region of the relatively large gradient angle on the shank side relative to the change point are ensured in a well-balanced manner, and the web thickness can be reduced on the tool tip side where the radial dimension of the outer circumferential cutting edge becomes smaller while ensuring the strength and rigidity, so that the chip discharge performance can be improved.

In the tapered end mill according to the sixth aspect of the invention, since the gradient angle of the flute bottom radius is smoothly changed in the vicinity of the change point, the chips flow more smoothly in the longitudinal direction of the flute regardless of the presence of the change point, so that the chip discharge performance is improved, and the stress concentration at the change point is relaxed.

In the tapered end mill according to the seventh aspect of the invention, since the rake angle of the outer circumferential cutting edge is substantially constant over the entire length of the outer circumferential cutting edge, the same cutting performance can be obtained over the entire length of the outer circumferential cutting edge, and a cutting surface having substantially the same surface quality such as surface roughness can be obtained over the entire area in the tool axis direction.

BRIEF DESCRIPTION OF DRAWINGS

FIG. 6 is a diagram for explaining a result of cutting performance examined by performing groove cutting while changing a tool feed speed by using a product of the present invention and comparative products 1, 2.

MODES FOR CARRYING OUT THE INVENTION

Figure 1:
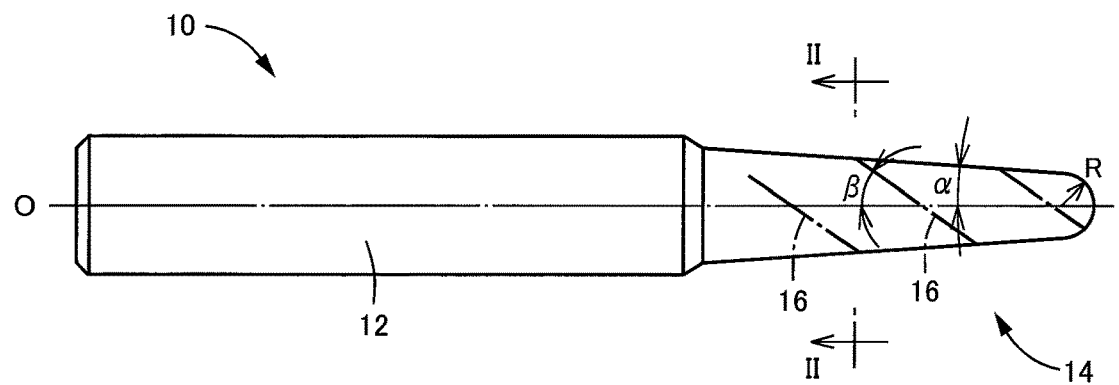
FIG. 1 is a front view of a tapered ball end mill that is an example of the present invention in a direction perpendicular to a tool axis O.

A tapered end mill of the present invention may be a tapered end mill in which an end cutting edge at a tip is disposed in a plane perpendicular to a tool axis, or a tapered ball end mill in which an end cutting edge at a tip is disposed on a hemisphere. Unless otherwise distinguished, the tapered end mill also refers to the tapered ball end mill. Although the tapered end mill is desirably a two-flute or three-flute or more multi-flute tapered end mill provided with multiple flutes and outer circumferential cutting edges at equal intervals around a tool axis, the present invention may also be applicable to a single-flute tapered end mill with one flute. Although the tapered end mill is desirably a helical-flute tapered end mill provided with a helical flute around the tool axis, the present invention may also be applicable to a straight-flute tapered end mill provided with a straight flute parallel to the tool axis. Although cemented carbide is preferably used as the material of the tapered end mill, other tool materials such as high-speed steel can also be used. A cutting portion provided with an outer circumferential cutting edge and a bottom cutting edge may be provided with a hard film such as DLC (diamond-like carbon) or subjected to a surface hardening treatment etc. as needed. The tapered end mill may be used for finishing or roughing.

The change point for changing the gradient angle is located suitably in a range of 0.2 L to 0.7 L from the tool tip, desirably in a range of 0.3 L to 0.6 L, when L is the cutting edge length of the tapered end mill, for example. Therefore, while an effect of reducing the web thickness on the tool tip side to improve the chip discharge performance may not sufficiently be obtained at a position closer than 0.2 L from the tool tip, an effect of increasing the gradient angle θ2 on the shank side to ensure strength and rigidity may not sufficiently be obtained at a position farther than 0.7 L from the tool tip. However, depending on a length of a cutting edge length L, a size of the taper half angle α, etc., the change point can be set at a position closer than 0.2 L or farther than 0.7 L from the tool tip. Although only one change point of the gradient angle may exist, two or more change points of the gradient angle can be disposed in the tool axis direction to change the gradient angle in stages. The change point of the gradient angle can also be determined based on a tip tool diameter D and is located suitably in a range of 1 D to 10 D from the tool tip, desirably within the range of 1 D to 5 D; however, when the tip tool diameter D is large, the change point can be set at a position closer than 1 D from the tool tip.

It is desirable that the gradient angle is smoothly changed in the vicinity of the change point. For example, when a flute is ground by an outer circumferential surface of a rotary grinding wheel, a roundness corresponding to the outer diameter of the rotary grinding wheel is formed at the change point of the gradient angle, so that the gradient angle is smoothly changed. Depending on a method of machining a flute, the gradient angle can abruptly be change within a relatively narrow range of the change point. Additionally, if the flute depth changes as the flute bottom radius changes, a rake angle of the outer circumferential cutting edge disposed along the flute may change; however, for example, an outer circumferential surface shape of the rotary grinding wheel, i.e., a grinding surface shape, can appropriately be determined to maintain the rake angle constant regardless of the change in the flute depth. If the rake angle changes, finishing can be performed to make the rake angle constant. The rake angle does not necessarily need to be constant and may change in the tool axis direction.

Example

An example of the present invention will now be described in detail with reference to the drawings. In the following example, the figures are simplified or deformed as needed and portions are not necessarily precisely drawn in terms of dimension ratio, shape, etc.

Figure 2:
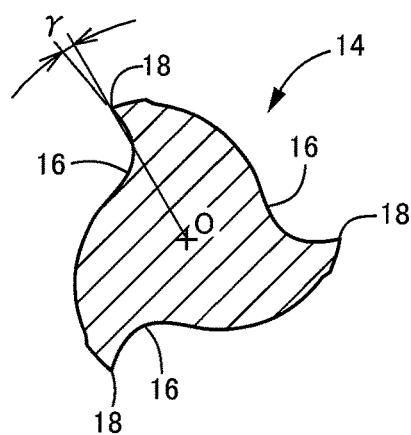
FIG. 2 is a cross-sectional view taken along a line II-II and viewed in a direction of arrows of FIG. 1.
Figure 3:
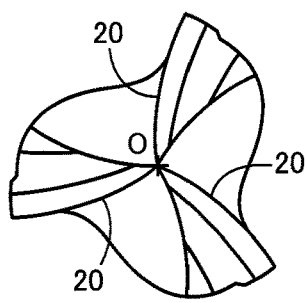
FIG. 3 is a bottom view of the tapered ball end mill as viewed from the tool tip side of FIG. 1.

FIG. 1 is a diagram for explaining a tapered ball end mill 10 that is an example of the present invention and is a front view in a direction perpendicular to a tool axis O. FIG. 2 is a cross-sectional view taken along a line II-II and viewed in a direction of arrows of FIG. 1, and FIG. 3 is a bottom view of the tapered ball end mill 10 as viewed from the tool tip side, i.e., from the right side of FIG. 1. The tapered ball end mill 10 integrally includes a shank 12 and a cutting portion 14 concentrically with the tool axis O and is relatively moved in a direction orthogonal to the tool axis O with respect to a workpiece while the shank 12 is held and rotationally driven around the tool axis O, thereby cutting a V-shaped groove having a gentle V-shaped cross section with a width dimension made narrower toward a groove bottom. Therefore, the cutting portion 14 forms a taper shape having a diameter gradually decreasing toward the tool tip side in accordance with a change in the flute width, the outer circumferential surface of the taper-shaped cutting portion 14 is provided with three helical flutes 16 around the tool axis O at equal angular intervals, and each of the three helical flutes 16 is provided with an outer circumferential cutting edge 18 along one open end edge of the helical flute 16. The tip of the cutting portion 14 forms a hemispherical shape, and an end cutting edge 20 smoothly connected to the outer circumferential cutting edge 18 is disposed on the hemisphere. The nominal size of the tapered ball end mill 10 is R1.8×4°, the radius R of the tip hemispherical shape is 1.8 mm, and the taper half angle α of the cutting portion 14 is 4°.

The tapered ball end mill 10 is rotationally driven clockwise around the tool axis O for cutting when viewed from the shank 12 side, so that the helical flutes 16 are right-handed, and chips cut out by the outer circumferential cutting edge 18 and the end cutting edge 20 are discharged through the helical flutes 16 to the shank 12 side. A helical angle β of the helical flutes 16 is about 35°, and the rake angle γ of the outer circumferential cutting edge 18 is substantially constant over the entire length of the outer circumferential cutting edge 18 and is about 10°. The material of the tapered ball end mill 10 is cemented carbide, and the surface of the cutting portion 14 is coated with a hard film that is a DLC film. The tapered ball end mill 10 as described above is used, for example, in the case of roughing of a V-shaped groove at a high-speed feed with a feed per tooth fz of 0.1 (mm/t) or more. The tapered ball end mill 10 corresponds to a tapered end mill, and the helical flutes 16 correspond to flutes extending in the tool axis O direction.

Figure 4:
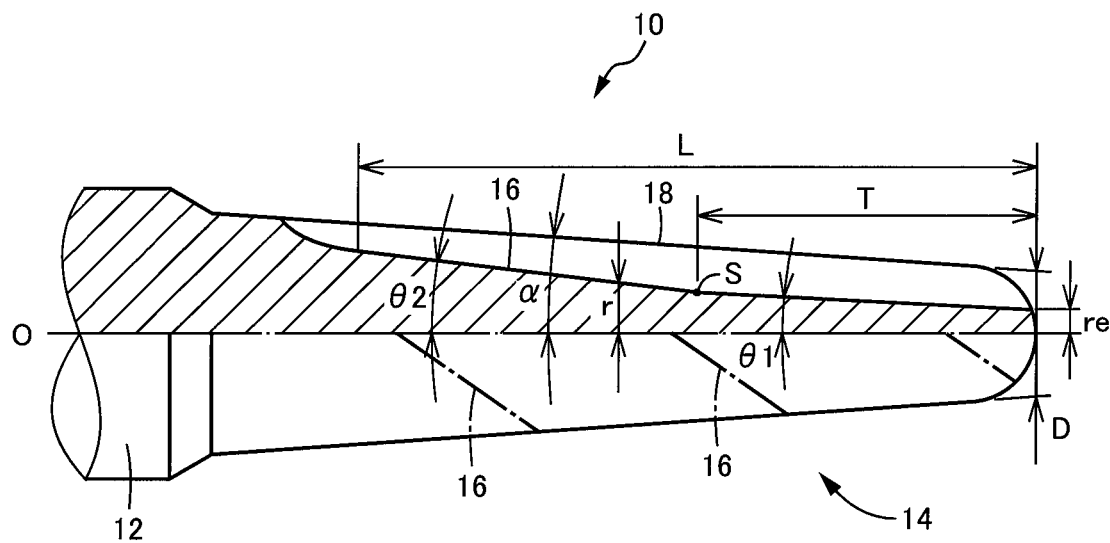
FIG. 4 is an enlarged view of the cutting portion of the tapered ball end mill, and the upper half is a cross-sectional view when one of the helical flutes is untwisted and made parallel to the tool axis O.

FIG. 4 is an enlarged view of the cutting portion 14 of the tapered ball end mill 10, and the upper half is a cross-sectional view when one of the helical flutes 16 is untwisted and made parallel to the tool axis O. As is clear from FIG. 4, the helical flute 16 is disposed such that a flute bottom radius r, i.e., the distance between the flute bottom and the tool axis O, decreases from the shank 12 side toward the tool tip side. The flute bottom radius r linearly changes at predetermined gradient angles θ1, θ2 in the tool axis O direction, i.e., in the left-right direction of FIG. 4. Therefore, the flute bottom radius r increases at the gradient angle θ1 from the tool tip toward the change point S on the tool tip side relative to the change point S, while the flute bottom radius r increases at the gradient angle θ2 from the change point S toward the shank 12 on the shank 12 side relative to the change point S, and the gradient angle θ2 is greater than the gradient angle θ1. A dimension $2r$ is twice the flute bottom radius r and corresponds to the web thickness.

When L is the cutting edge length of the tapered end mill 10 provided with the outer circumferential cutting edges 18 and the end cutting edges 20, the change point S is defined within a range of 0.2 L to 0.7 L from the tool tip in the tool axis O direction. Therefore, a distance T from the tool tip to the change point S is within the range of 0.2 L to 0.7 L and is about 0.5 L in this example. Specifically, the cutting edge length is L≈20 mm, and the distance is T=0.5 mm. L≈10 mm. When the distance T is expressed by using the tip tool diameter D, the tip tool diameter D≈3.36 mm leads to T≈(10/3.36)D≈3D, which is within a range of 1 D to 10 D.

The gradient angle θ1 is smaller than the taper half angle α of the cutting portion 14 provided with the outer circumferential cutting edges 18 and is within the range of 0°≤θ1≤30°, and since the taper half angle α is 4° in this example, the gradient angle θ1 is defined substantially within the range of 0°≤θ<4°. In this example, the tapered end mill has the gradient angle θ1≈3° and a flute bottom radius re=0.4 D/2≈0.67 mm at the tool tip. The gradient angle θ2 is greater than the taper half angle α and is θ2≈7° in this example. These gradient angles θ1, θ2 are gradient angles in the tool axis O direction, and the gradient angle of the flute bottom radius in the direction along a helix of the helical flute 16 twisted around the tool axis O are gentler than these gradient angles θ1, θ2.

The helical flute 16 is ground by an outer circumferential surface of a rotary grinding wheel, for example. Specifically, by allowing the rotary grinding wheel disposed in a posture inclined with respect to a tapered ball end mill material at the helical angle θ to approach or separate while the tapered ball end mill material is rotated and lead feed is relatively performed in the tool axis O direction, a gradient can be formed in the flute bottom radius r, and the gradient angle can be changed to θ1 and θ2 by changing the approaching/separating speed. In this case, roundness corresponding to the outer diameter of the rotary grinding wheel is formed at the change point S of the gradient angles θ1, θ2, and the gradient angles are smoothly changed in the vicinity of the change point S. In other words, the change point S has a predetermined length in the tool axis O direction, and the gradient angle continuously changes from θ1 to θ2 in that region. When the flute depth changes as the flute bottom radius r changes, the rake angle γ of the outer circumferential cutting edge 18 disposed along the helical flute 16 may change; however, for example, by appropriately determining an outer circumferential surface shape, i.e., a grinding surface shape, of the rotary grinding wheel, the rake angle γ can be kept constant regardless of the change in the flute depth b. If the rake angle γ changes, finishing can be performed so that the rake angle γ becomes constant.

In the tapered ball end mill 10 of this example as described above, since the flute bottom radius r linearly changes at the gradient angles θ1, θ2 in the tool axis O direction, and the gradient angle θ1 on the tool tip side is smaller than the gradient angle θ2 on the shank 12 side, the web thickness can be reduced on the tool tip side where the radial dimension of the outer circumferential cutting edge 18 becomes smaller while ensuring the strength and rigidity, so that the chip discharge performance can be improved. Specifically, since the gradient angle θ1 of the flute bottom radius r of the tool tip side portion is small, the web thickness can be prevented from becoming extremely small and impairing the strength and rigidity, and since the web thickness increases at a large change rate toward the shank 12 on the shank 12 side having the large gradient angle θ2, the strength and rigidity of the tool can appropriately be ensured as a whole so as to prevent breakage etc.

The gradient angles θ1, θ2 of the flute bottom radius r are only changed at the predetermined change point S, and therefore, for example, when the helical flute 16 is machined on the outer circumferential surface of the tapered ball end mill material with a grinding wheel, it is only required to change a moving speed of the grinding wheel approaching to and separating from the tapered ball end mill material on the way, so that the helical flute 16 can easily be machined by a single flute grinding process, and chips in the helical flute 16 flow more smoothly as compared to when a step is disposed, so that the chip discharge performance is favorably maintained.

Since the multiple helical flutes 16 are disposed around the tool axis O and the multiple outer circumferential cutting edges 18 are disposed along the multiple helical flutes 16, the load applied to the tapered ball end mill 10 is dispersed and the breakage etc. are prevented. While the outer circumferential cutting edges 18 are disposed along the helical flutes 16 and chips are discharged toward the shank 12 through the helical flutes 16, the gradient of the flute bottom radius r is only increased in the middle, and therefore, chips flow more smoothly toward the shank 12 as compared to when a step is disposed, so that the chip discharge performance is favorably maintained.

Since the gradient angle θ1 on the tool tip side relative to the change point S is smaller than the taper half angle α of the cutting portion 14 and is within the range of 0°≤θ1≤30°, the web thickness of the tool tip side portion can be reduced to improve the chip discharge performance while an extremely small web thickness can be avoided to ensure the strength and rigidity.

Since the gradient angle θ2 on the shank 12 side relative to the change point S is larger than the taper half angle α of the cutting portion 14, an increase rate of the flute bottom radius r, i.e., an increase rate of the web thickness, becomes larger than an increase rate of the radial dimension of the outer circumferential cutting edge 18 increasing toward the shank 12, so that the strength and rigidity against a machining load can appropriately be ensured to prevent breakage etc.

Since the change point S is defined within the range of 1 D to 10 D from the tool tip, the web thickness is reduced in a region of the relatively small gradient angle θ1 on the tool tip side relative to the change point S so that the chip discharge performance can favorably be improved, and an extremely small web thickness of the tool tip side portion can be avoided to ensure the strength and rigidity.

Since the change point S is set within the range of 0.2 L to 0.7 L from the tool tip, the region of the relatively small gradient angle θ1 on the tool tip side relative to the change point S and the region of the relatively large gradient angle θ2 on the shank 12 side relative to the change point S are ensured in a well-balanced manner, and the web thickness can be reduced on the tool tip side where the radial dimension of the outer circumferential cutting edge 18 becomes smaller while ensuring the strength and rigidity, so that the chip discharge performance can be improved.

Since the gradient angles θ1, θ2 are smoothly changed in the vicinity of the change point S, the chips flow more smoothly toward the shank 12 in the helical flute 16 regardless of the presence of the change point S, so that the chip discharge performance is improved, and the stress concentration at the change point S is relaxed.

Since the rake angle γ of the outer circumferential cutting edge 18 is substantially constant over the entire length of the outer circumferential cutting edge 18, the same cutting performance can be obtained over the entire length of the outer circumferential cutting edge 18, and a cutting surface having substantially the same surface quality such as surface roughness can be obtained over the entire area in the tool axis O direction.

Figure 5:
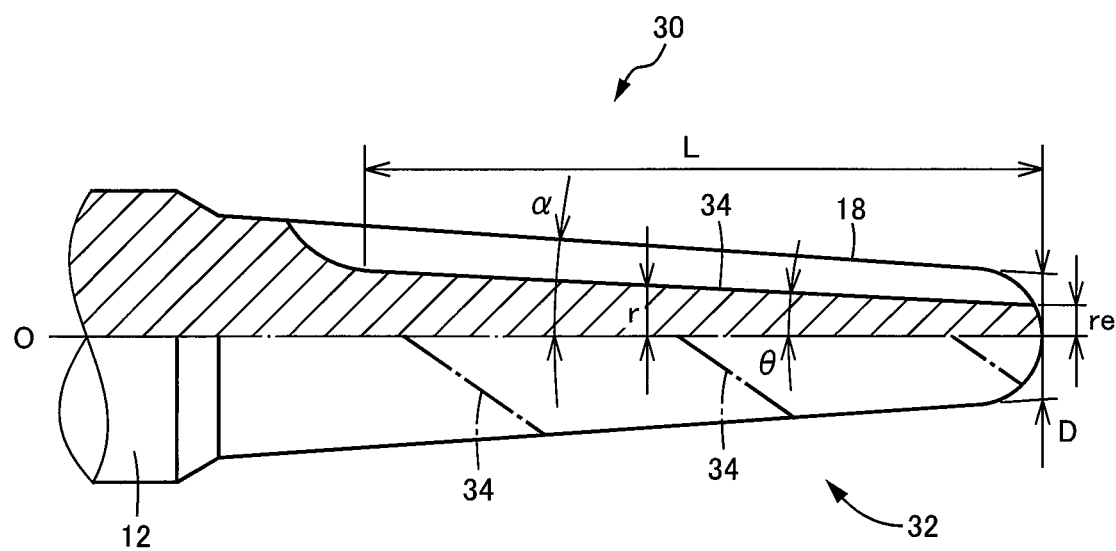
FIG. 5 is a diagram for explaining a comparative product in which a flute bottom radius of a helical flute changes at a constant gradient angle in the tool axis O direction, corresponding to FIG. 4 showing the cross-sectional shape of the helical flute in the tool axis O direction in the upper half.

Description will then be made of results of cutting performance examined by performing groove cutting while changing a tool feed speed by using the tapered ball end mill 10 of the example as the product of the present invention, a tapered ball end mill 30 including a cutting portion 32 shown in FIG. 5 prepared as a comparative product 1, and a commercially available product with a nominal size of R1.8×4° prepared as a comparative product 2. FIG. 5 is a diagram corresponding to FIG. 4, and the tapered ball end mill 30 is the same as the tapered ball end mill 10 except that the size and gradient of the flute bottom radius r of the helical flute 34 are different. Specifically, the gradient angle θ of the flute bottom radius r of the helical flute 34 in the tool axis O direction is constant over the entire length of the cutting edge length L, and the gradient angle θ is about 3°, which is the same as the gradient angle θ1. The flute bottom radius re at the tool tip is slightly larger than that of the tapered ball end mill 10 and is 0.5 D/2, which is about 0.84 mm.

Figure 7:
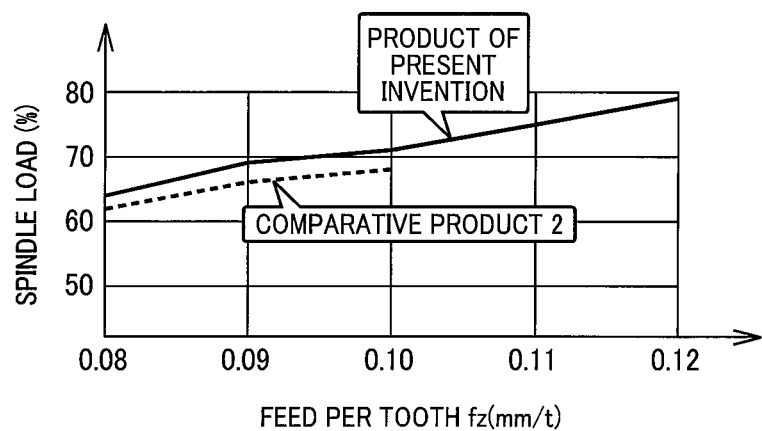
FIG. 7 is a diagram showing a graph of a relationship between a feed per tooth fz and a spindle load for the product of the present invention and the comparative product 2.

The results of cutting performance examined by performing groove cutting under the cutting test conditions described below are shown in FIGS. 6 and 7. FIGS. 6 and 7 show the results of cutting distance etc. examined by performing groove cutting while changing a feed per tooth fz (tool feed speed Vf) in stages. A column of "cutting distance" of FIG. 6 shows results of examining whether a groove of 150 mm can be machined and, in the case of breakage in the middle, the cutting distance until the breakage is shown. In a column of "success/failure of cutting", "○" means that a groove of 150 mm was successfully cut, and "x" means that the cutting of a groove of 150 mm was failed. In the case of failure to cut a groove of 150 mm, no further determination was made on cutting performance. A column of "spindle load" shows a rate (%) of a maximum value of a spindle torque during groove cutting compared with a maximum torque of a machine. In the columns of "cutting sound", "vibration", and "welding", "○", "Δ", and "x" mean good, acceptable (within the allowable range), and not acceptable (outside the allowable range), respectively, and are based on sensory evaluation by a tester.

<Cutting Test Conditions>
Work material: A2618 (aluminum alloy defined by JIS)
Rotation speed n: 24000 (min$^{-1}$)
Feed per tooth fz: 0.08 to 0.125 (mm/t)
Tool feed speed Vf: 5760 to 9000 (mm/min)
Axial depth ap: 7.7 (mm)
Cutting fluid: water-soluble cutting oil
Machine used: vertical machining center As is clear from the test results of FIG. 6, while the comparative product 2 is broken at the feed per tooth fz=0.10 (mm/t) and failed to perform machining, and the comparative product 2 is broken at a feed per tooth fz=0.11 (mm/t) and failed to perform machining, the product of the present invention was able to perform machining up to the feed per tooth fz=0.12 (mm/t). It can also be seen that while the comparative products 1 and 2 can perform machining with the spindle load up to about 67 to 68%, the product of the present invention can perform machining up to about 79% and provide high breakage strength. FIG. 7 shows a graph for comparing a relationship between the feed per tooth fz and the spindle load for the product of the present invention and the comparative product 2, and although the spindle load becomes higher as the feed per tooth fz increases in both cases, the product of the present invention can perform machining to a region where the spindle load is higher than that of the comparative product 2, so that the feed per tooth fz can be increased to perform high-efficiency machining. Returning to FIG. 6, the product of the present invention is superior to the comparative products 1 and 2 in terms of cutting sound and vibration and was acceptable, i.e., within the allowable range, up to the feed per tooth fz=0.11 (mm/t). Although it seems that the comparative product 2 is superior to the product of the present invention in terms of welding, the product of the present invention was acceptable, i.e., within the allowable range, up to the feed per tooth fz=0.12 (mm/t).

Although the example of the present invention has been described in detail with reference to the drawings, this is merely an embodiment, and the present invention can be implemented in variously modified and improved forms based on the knowledge of those skilled in the art.

REFERENCE SIGNS LIST

10: tapered ball end mill (tapered end mill) 12: shank 14: cutting portion 16: helical flute (flute) 18: outer circumferential cutting edge O: tool axis r: flute bottom radius θ1, θ2: gradient angles S: change point a: taper half angle γ: rake angle L: cutting edge length D: tip tool diameter

The invention claimed is:

1. A tapered end mill including an outer circumferential cutting edge disposed along a flute extending in a tool axis direction with a diameter of the outer circumferential cutting edge reduced toward a tool tip side, wherein
the flute is disposed such that a flute bottom radius defined as a distance between a flute bottom and the tool axis decreases from a shank side toward the tool tip side, wherein
the flute includes (i) a tool-tip-side portion extending away from a tool tip to a predetermined change point and (ii) a shank-side portion extending from the change point to a shank-side end of the flute, wherein
the flute bottom radius linearly changes at a first predetermined gradient angle θ1 in the tool axis direction in the tool-tip-side portion of the flute, and linearly changes at a second predetermined gradient angle θ2 in the tool axis direction in the shank-side portion of the flute, wherein
the gradient angle θ1 in the tool-tip-side portion of the flute is smaller than the gradient angle θ2 in the shank-side portion of the flute, and wherein
the gradient angle θ1 in the tool-tip-side portion of the flute is equal to or larger than 0° and smaller than a taper half angle α of a cutting portion provided with the outer circumferential cutting edge, and the gradient angle θ2 in the shank-side portion of the flute is larger than the taper half angle α.

2. The tapered end mill according to claim 1, wherein
the flute is one of a plurality of flutes disposed around the tool axis at equal angle intervals, while the outer circumferential cutting edge is one of a plurality of outer circumferential cutting edges disposed along the plurality of flutes, respectively, wherein
the flute is a helical flute twisted around the tool axis, and wherein a helical direction of the helical flute is determined such that chips cut out by the outer circumferential cutting edge are discharged toward the shank side when the tapered end mill is rotationally driven around the tool axis.

3. The tapered end mill according to claim 1, wherein
the gradient angle θ1 is within a range of 0°≤θ1≤30°.

4. The tapered end mill according to claim 1, wherein
when D is a tip tool diameter, the change point is defined within a range of 1 D to 10 D from the tool tip in the tool axis direction.

5. The tapered end mill according to claim 1, wherein
when L is a cutting edge length of the tapered end mill the change point is defined within a range of 0.2 L to 0.7 L from the tool tip in the tool axis direction.

6. The tapered end mill according to claim 1, wherein
the gradient angle smoothly changes in the vicinity of the change point.

7. The tapered end mill according to claim 1, wherein
a rake angle of the outer circumferential cutting edge is constant over the entire length of the outer circumferential cutting edge.

* * * * *